United States Patent [19]

Stoops et al.

[11] Patent Number: 4,721,008
[45] Date of Patent: Jan. 26, 1988

[54] ADJUSTABLE STEERING WHEEL HUB

[75] Inventors: George J. Stoops, Northville; William A. Grabowski, Dearborn, both of Mich.

[73] Assignee: American Motors Corporation, Southfield, Mich.

[21] Appl. No.: 65,074

[22] Filed: Jun. 17, 1987

Related U.S. Application Data

[63] Continuation of Ser. No. 835,542, Mar. 3, 1986, abandoned.

[51] Int. Cl.⁴ .................. B62D 1/04; F16D 1/00; F16L 23/00; G05G 1/10
[52] U.S. Cl. ..................................... 74/552; 403/337; 403/4
[58] Field of Search .............. 74/552; 403/335–338, 403/4; 29/159 B

[56] References Cited

U.S. PATENT DOCUMENTS

| | | | |
|---|---|---|---|
| 1,593,202 | 7/1926 | Tischer | 74/552 |
| 1,861,226 | 5/1932 | O'Connor | 74/552 |
| 1,879,936 | 9/1932 | Ivandick | 74/552 |
| 2,250,448 | 7/1941 | Edwards | 403/337 |
| 2,954,708 | 10/1960 | Huzzard | 74/552 |
| 3,302,478 | 2/1967 | Pauwels | 74/493 |
| 3,342,080 | 9/1967 | Cantleberry | 74/493 |
| 3,365,976 | 1/1968 | Reed et al. | 74/493 |
| 3,659,476 | 5/1972 | Wifert et al. | 74/552 |
| 3,891,248 | 6/1975 | Kannapell | 403/337 |
| 4,018,537 | 4/1977 | Kock et al. | 74/552 |
| 4,086,012 | 4/1978 | Buckley et al. | 403/337 |
| 4,161,058 | 7/1979 | Sasaki | 29/428 |
| 4,229,994 | 10/1980 | Plamper | 74/552 |
| 4,449,419 | 5/1984 | Bruguera | 74/493 |
| 4,527,444 | 7/1985 | McKee et al. | 74/493 |

FOREIGN PATENT DOCUMENTS

| | | | |
|---|---|---|---|
| 776976 | 2/1935 | France | 74/552 |
| 970444 | 1/1951 | France | 74/552 |
| 386776 | 8/1951 | France | 74/552 |
| 1124676 | 10/1956 | France | 74/552 |
| 58-221766 | 12/1983 | Japan | 74/552 |
| 346442 | 6/1960 | Switzerland | 74/552 |
| 266126 | 2/1927 | United Kingdom | 74/552 |
| 1236264 | 6/1971 | United Kingdom | 74/552 |

Primary Examiner—Gary L. Smith
Assistant Examiner—Vinh Luong
Attorney, Agent, or Firm—Brooks & Kushman

[57] ABSTRACT

An adjustable steering wheel hub in an automobile steering mechanism comprises a first hub member and a second hub member. The first hub member includes a circumferentially splined bore adapted to be engaged with a circumferentially splined section of a steering shaft. The second hub member is coupled to a steering wheel and includes at least one threaded aperture registering with an arcuate aperture in the first member through which a fastener is secured to provide a selectively, adjustable, angularly fixed connection between the first hub portion and the second hub portion.

6 Claims, 3 Drawing Figures

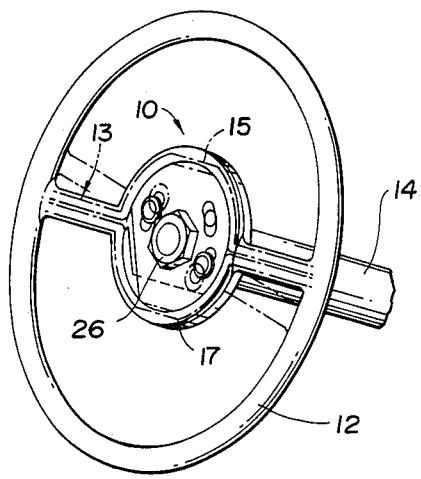
Fig. 1
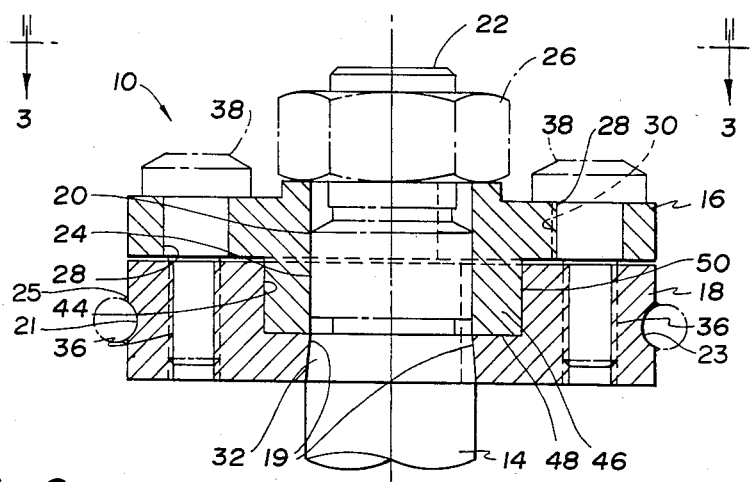
Fig. 2
Fig. 3

ADJUSTABLE STEERING WHEEL HUB

This is a continuation of application Ser. No. 835,542, filed on Mar. 3, 1986, now abandoned.

BACKGROUND OF THE INVENTION

I. Field of the Present Invention

This invention relates to a vehicle steering mechanism and more particularly to a steering wheel mounting hub that allows for angular alignment of the steering wheel with respect to a rotatable steering shaft without having to disassemble the steering mechanism or remove the steering wheel.

II. Description of the Prior Art

In a conventional automobile, the steering mechanism includes a steering wheel fixedly connected to a rotatable steering shaft which actuates other moving parts to control the direction of the steered wheels. This fixed connection between the steering wheel and the rotatable steering shaft is accomplished by a set of circumferential splines on the end of the rotatable steering shaft and a corresponding set of circumferential splines located in the hub of the steering wheel. The steering wheel hub is mated with the end of the rotatable steering shaft by positioning the steering wheel hub over the splined end of the rotatable steering shaft.

Most automobile steering wheels have an arrangement of spokes extending between the hub and rim, or a design on the hub, which has a relative upward or straight position. When an automobile is newly assembled, the relative positioning of the steering wheel is such that the design is relatively upward and straight when the steered wheels are in a forward direction. However, as the suspension and wheel alignment are tuned to specifications, the steering wheel can become disoriented from its upright position. In addition, as the automobile is driven and subjected to road bumps, its steering wheels may be knocked out of alignment. Upon subsequent restoration of steering wheel alignment, the steering wheel may be disoriented from its straight position even though the wheels and steering mechanism are aligned for proper functioning. When the steering wheel is out of line, a view of gauges on the automobile's instrument cluster is often obstructed by portions of the steering wheel. In addition, the ornamental appearance of the wheel is adversely affected and may be erroneously perceived as an indication of inferior workmanship.

In order to re-align the steering wheel in its straight position, the steering wheel must be removed from the rotatable steerng shaft such that the circumferential splines on both parts disengage. Then, after realigning the steering wheel, the steering wheel is remated with the rotatable steering shaft. Unfortunately, this procedure provides for only a coarse adjustment of the steering wheel's angular alignment since it depends upon the size of and the spacing between the splines. In addition, it requires a partial dismantling of the automobile steering mechanism which can be time-consuming and laborious.

Although previously known means for adjusting a steering wheel are discussed in U.S. Pat. Nos. 3,302,478, 3,342,080, 3,365,976, 4,161,058, 4,449,419 and 4,527,444, these patents are concerned with mechanisms for adjusting the angle of inclination of the steering shaft or the axial position of the steering wheel. None of the patents teach or suggest a means for adjusting the angular position of a vehicle steering wheel with respect to the steering shaft about the rotary axis of the shaft.

SUMMARY OF THE PRESENT INVENTION

An object of the present invention is to provide an improved means for adjusting steering wheel alignment within a vehicle steering mechanism so that the steering wheel can be aligned without dismantling the steering mechanism or removing the steering wheel from a steering shaft.

The invention generally comprises a hub used to mount a steering wheel on a rotatable steering shaft having a set of circumferential splines thereupon for fixedly engaging the steering wheel for rotation with the shaft. The hub comprises a first hub member having a centered circumferentially splined bore adapted to receive the rotatable steering shaft, and a second hub portion having a second centered bore also adapted to receive the shaft therethrough, and means for selectively locking said first member in a fixed rotational position with respect to the second member. Preferably, the first and second members include registering apertures radially spaced from the central bore. The apertures in said first member are arcuately elongated while the apertures in said second member are threaded so as to receive threaded fasteners that pass through the registering arcuately shaped apertures in the first hub portion and allow for relative rotation of the first and second hub members when the fasteners are loosened.

The hub of the present invention allows the automobile steering wheel to be aligned relative to the rotatable shaft without having to dismount the steering wheel from the shaft. Adjustment is possible without regard to the length, and width, or the distance between the splines because the steering wheel can be aligned by relative rotation of the second hub member with respect to the first hub member. Thus, adjustment can be accomplished without separating the splines of the first hub member from those on the rotatable steering shaft. Consequently, precise alignment of the steering wheel after the entire steering system has been assembled is made possible and a clear view of the vehicle instrument cluster is easily maintained.

The above object and other objects, features, and advantages of the present invention are readily apparent from the following detailed description of the best mode for carrying out the invention.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 1 is a perspective view showing a steering wheel attached to a steering wheel shaft by a hub constructed in accordance with the present invention;

FIG. 2 is a sectional elevational view showing the steering wheel hub constructed in accordance with the present invention; and FIG. 3 is a plan view of the steering wheel hub constructed in accordance with the present invention.

BEST MODE FOR CARRYING OUT THE INVENTION

Referring first to FIG. 1 of the drawing, an adjustable steering wheel hub 10 constructed in accordance with the present invention is used to couple a steering wheel 12 with a rotatable steering shaft 14, which through other parts (not shown) controls the steering of a vehicle. As is more fully hereinafter described, the adjustable steering wheel hub 10 also provides for selective angular adjustment of the steering wheel 12 relative to the rotatable steering shaft 14 without having to remove the steering wheel and without regard to the relative positions of the splines used to connect the shaft to the steering wheel.

As seen in FIG. 2, the adjustable steering wheel hub 10 comprises a first hub member 16 and a second hub member 18. The rotatable steering shaft 14 includes a tapered shaft portion 19 adjacent a set of circumferential splines 20 and also a threaded end portion 22. The first hub portion 16 has a bore 24 having a set of circumferential splines that correspond with the circumferential splines 20 on the rotatable steering shaft 14. Through this arrangement, the first hub portion 16 is fixedly engaged to the rotatable steering shaft 14. The first hub portion 16 is axially secured to the rotatable steering shaft 14 by a hub lock nut 26. The first hub portion 16 has two arcuate apertures 28 and one arcuate aperture 30, best seen in FIG. 3, radially spaced from the bore 24.

The second hub member 18 has a tapered aperture 32 that registers with the tapered shaft portion 19 of the rotatable steering shaft 14. The second hub member 18 also has two threaded apertures 36 that register with the two arcuate apertures 28 in the first hub member 16. Two Torx screws 38 pass through the two arcuate apertures 28 in the first hub member 16 and are removably threaded into apertures 36 in the second hub member 18. These screws 38 include enlarged heads which become tightened against the first hub member 16 to connect the first hub member 16 to the second hub member 18 in a fixed position when the screws are tightened into the threaded apertures 36. However, the bolts can be loosened so as to be slideable within the arcuate apertures and thereby provide for selective angular adjustment of the first hub member 16 with respect to the second hub member 18.

The steering wheel 12 includes an armature 13 and the second hub member 18 is adapted to be secured to the armature 13. Alternatively, the second hub member 18 can be integrally constructed with the central portion of the steering wheel 12. In the preferred embodiment, the armature 13 includes an upper central arm 15 spaced apart from a lower central arm 17, and the hub member 18 includes linear peripheral grooves 21 and 23 adapted to receive the upper and lower arms respectively. The arms are welded to the hub member 18 as shown at 25 in FIG. 2. Of course, as the construction of the steering wheel requires, the means for coupling the hub member 18 to the steering wheel can be varied as desired to provide a secure connection.

The arcuate aperture 30 permits the installation of an electrical tower 56 through which electrical conductors can be provided to controls or instrumentation on the steering wheel. In addition, the aperture can be used to receive a turn signal cancel cam tower. In any event, it will be understood that the installation of any such components does not affect the adjustability of the hub since they can slide within the arcuate aperture 30 in the same manner as the screws in the arcuate slots 28.

In addition, in the preferred embodiment, the tapered aperture 32 is defined by a tapered peripheral wall having a reduced axial length to reduce the surface area of the second hub member 18 in contact with the tapered shaft portion 19. The reduced length is provided by a central recess 44 in the second hub member 18 adapted to receive an elongated annular wall 46 surrounded the central bore 24 in the first hub member 16. Thus, the spline connection between the hub 10 and the shaft 22 is elongated, whereas the wedged engagement of the tapered aperture 32 with tapered shaft portion 19 is more easily broken free due to its reduced area of frictional engagement. Preferably, the annular surface 48 and the cylindrical surface 50. mate with corresponding surfaces on the second hub member 18 to stably restrain the steering wheel 12 relative to the shaft 22.

Selective angular alignment of the steering wheel 12 relative to the rotatable steering shaft 14 is accomplished by the following steps:
1. Loosening the hub lock nut 26;
2. Loosening the two Torx screws 38;
3. Pulling the steering wheel 12 loose from the tapered fit between the second hub member 18 and rotatable steering shaft;
4. Adjusting the steering wheel for the preferred alignment; and
5. Retightening the Trox screws 38 and then the hub lock nut 26.

After the alignment of the steering wheel 12 has been set, the two Torx screws 38 and the hub nut 26 are retightened to their specified torque. This procedure will provide for easily maintaining a clear view to the instrument cluster and for allowing the steering wheel to be adjusted without having to disassemble the steering mechanism or remove the steering wheel 12. Moreover, small angular adjustments can be made regardless of the distance between and the sizes of the splines.

While the best mode for carrying out the invention has been described in detail, those familiar with the art to which this invention relates will recognize alternative ways of practicing the invention without departing from the scope and spirit of the present invention as defined by the following claims. For example, the hub members can be configured as desired to include, for example, a cam lobe 52 which is operable to engage a turn signal cancellation switch shown diagrammatially at 54 in FIG. 3.

What is claimed is:

1. In combination with a vehicle steering mechanism having a steering wheel and a rotatable steering shaft including means for fixedly engaging said steering wheel for rotation with said steering shaft, said means comprising a set of circumferential splines on said steering shaft, the improvement comprising:

a means for selectively, angularly adjusting said steering wheel in infinitely variable increments with respect to said steering shaft regardless of the length, the width, and the distance between the splines, wherein said adjusting means comprises a two piece hub having a first hub member and a second hub member, and a tapered portion of said steering shaft adjacent said set of splines;

said first hub member including a means for engaging the splines on the rotatable steering shaft, and an axially elongated annular wall;

said second hub member including aperture means for rotatably receiving the steering shaft, said aperture means being defined by a tapered peripheral wall engaging at least a portion of the tapered portion of the steering shaft;

said second hub member also including a means for fixedly securing the steering wheel to said second hub member, and a central recess receiving said axially elongated wall; and a means for selectively locking said first member with said second member in a fixed, angularly adjustable position.

2. The mechanism disclosed in claim 1 wherein said means for selectively locking comprises at least one threaded aperture in said second member for receiving a fastener.

3. The mechanism disclosed in claim 1 wherein said means for locking comprises at least one arcuate aperture in said first hub member radially registering with said at least one threaded aperture, and an equal number of threaded fasteners removably threaded into said registering threaded apertures in said second hub portion, said threaded fasteners passing through the arcuate apertures in said first hub portion.

4. The invention as defined in claim 1 wherein said axially elongated wall includes an annular surface and said second hub includes a corresponding surface in mating engagement with said annular surface.

5. The invention as defined in claim 4 wherein said axially elongated wall includes a cylindrical surface and wherein said second hub member includes a corresponding surface in mating engagement with said cylindrical surface.

6. In combination with a vehicle steering mechanism having a steering wheel and a rotatable steering shaft including means for fixedly engaging said steering wheel for rotation with said steering shaft, said means comprising a set of circumferential splines on said shaft, the improvement comprising:

a two piece hub having a first hub member and a second hub member, and a tapered portion of said steering shaft adjacent said set of splines;

said first hub member including a circumferentially splined aperture adapted to engage said splines on said rotatable steering shaft, and an axially elongated, annular wall;

said first hub member also including at least one arcuately shaped, eccentric aperture;

said second hub member having a tapered aperture defined by a tapered peripheral wall engaging at least a portion of the tapered portion of the steering shaft, said second member also including at least one threaded aperture radially registering with each said arcuately shaped aperture, means for securing the steering wheel to said second hub member, and a central recess receiving said axially elongated wall; and at least one threaded fastener having an enlarged head and adapted to extend through said at least one arcuately shaped aperture in said first hub portion so as to become threadably engaged in said registering threaded aperture.

* * * * *

UNITED STATES PATENT AND TRADEMARK OFFICE
CERTIFICATE OF CORRECTION

PATENT NO. : 4,721,008

DATED : January 26, 1988

INVENTOR(S) : George J. Stoops and William A. Grabowski

It is certified that error appears in the above-identified patent and that said Letters Patent is hereby corrected as shown below:

Column 4, Line 11,   After "50" delete --.--;

Column 4, Line 24,   "Trox" should be --Torx--;

Column 4, Line 43,   "diagrammatially" should be --diagrammatically--.

Signed and Sealed this

Nineteenth Day of July, 1988

Attest:

DONALD J. QUIGG

Attesting Officer

Commissioner of Patents and Trademarks